Feb. 18, 1969   W. J. LOCKE, JR   3,428,446
FLUIDIZED BED PRODUCTION OF IRON
Filed Oct. 26, 1965
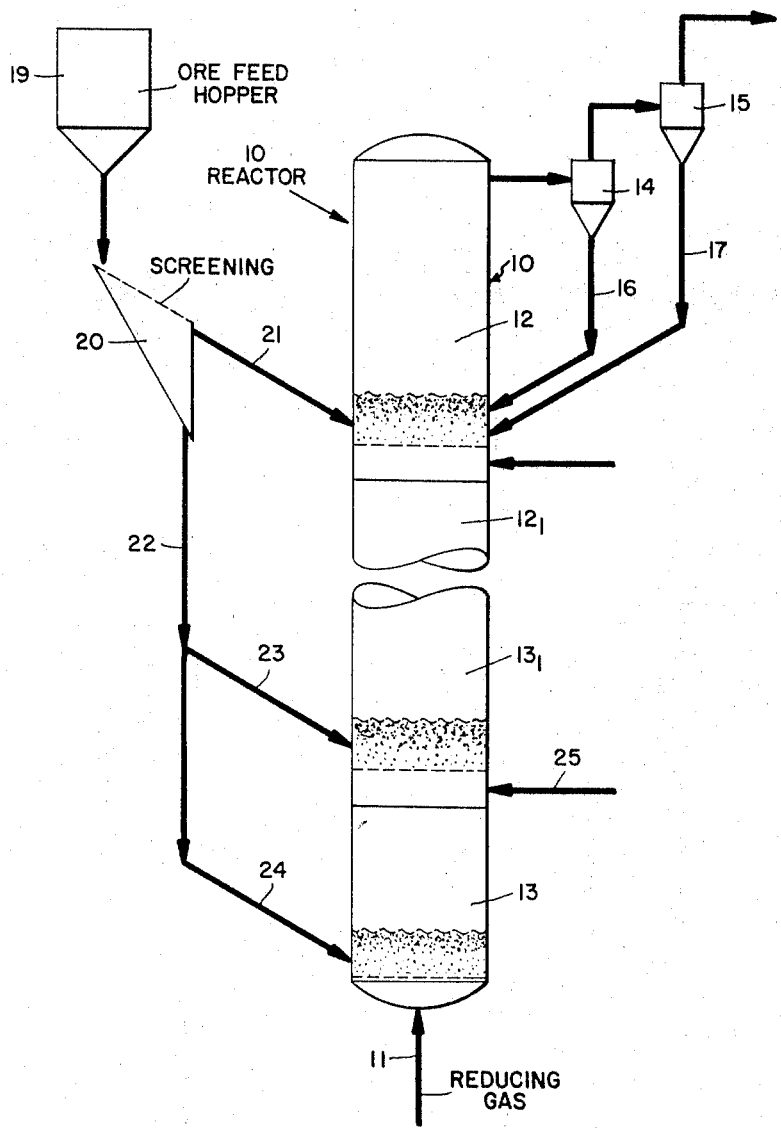
WARREN J. LOCKE, JR.   INVENTOR
BY Llewellyn A. Proctor
PATENT ATTORNEY

United States Patent Office 3,428,446
Patented Feb. 18, 1969

3,428,446
FLUIDIZED BED PRODUCTION OF IRON
Warren J. Locke, Jr., Baton Rouge, La., assignor to Esso Research and Engineering Company, a corporation of Delaware
Filed Oct. 26, 1965, Ser. No. 505,256
U.S. Cl. 75—26      4 Claims
Int. Cl. C22b 1/10, 1/14

ABSTRACT OF THE DISCLOSURE

Cyclone separator fouling and ore entrainment in fluidized iron ore reduction processes utilizing separate ferric and ferrous reduction zones are minimized by adding the fine ore particles directly to high temperature ferrous reduction zones and agglomerating the particles therein.

---

This invention relates to a method for the production of metallic iron in fluidized bed reactions wherein iron ores are directly contacted with reducing gases. In particular, it relates to an improved method wherein fluidized oxidic iron ores are metallized by direct countercurrent contact with hydrogen, carbon monoxide, or mixtures of these and other gases.

It is conventional to contact particulate solids with ascending gases to fluidize the solids and form fluidized beds for carrying out chemical reactions. In a fluidized bed the velocity of the ascending gas is adjusted in relation to the particle size and density of the solids to suspend the latter in a dense turbulent state simulating a boiling liquid.

Fluidized processes for the production of metallic iron are disclosed in the prior art. In such processes, particulate oxidic ores, i.e., ores consisting essentially of oxides of iron, are contacted at elevated temperatures, fluidized by the ascending gases, and reduced. While such process may provide a single fluidized bed, in the more advanced processes a plurality of fluidized beds are employed, and the beds are staged as separate reduction zones at different ore oxidation levels. The beds are operated at the same or at different elevated temperatures.

In such processes the particulate oxidic iron ore being treated is introduced into the top stage and flowed downwardly from one stage or zone to the next and contacted in the separate stages or zones by an ascending gas, or gases. In each succeeding zone, the ore is reduced to a lower state of oxidation. Thus, in a first zone, or zones, the oxides are reduced from the ferric state to magnetic oxide of iron (i.e., magnetite, or mixture of oxides approximating such compound). Such zone is often a "burning" zone, i.e., one wherein a hydrocarbon fuel and oxygen are burned to drive off the bound waters of hydration and to provide heat for the reactions. In a succeeding zone, or zones, the magnetic oxide of iron is reduced to ferrous oxide. In yet another succeeding zone, or zones, the ferrous oxide is reduced, in a ferrous reduction zone, to metallic iron. The metallic product withdrawn from the last ferrous reduction zone of the series generally ranges from about 85 to about 95 percent iron.

During the reductions, particularly when the degree of metallization becomes high, the particles undergo changes in size and shape, including some growth by agglomeration of small particles into larger particles. This is believed caused by a "stickiness" occurring upon the surfaces of the individual iron ore solids particles. The stickiness tends to promote adherence between individual particles, this phenomenon becoming more acute under certain conditions, e.g., increased temperature, increased hydrogen concentration, and, it is especially noticeable, as the degree of metallization increases. Generally, however, there is a net decrease in particle size due primarily to decrepitation, i.e., a tearing asunder of the individual particles to produce smaller particles, or fines. Moreover, a substantial portion of the iron-bearing ores now available to the iron and steel industry are of such small sizes that they are unsuitable unless first agglomerated.

Fines, whether produced or available from external sources, or produced internally in fluidized iron ore reduction systems, have provided an acute problem. Thus, in iron ore reduction processes, fines are blown from the process by the ascending gases and can represent a substantial debit to the process. On the other hand, lessening the velocity of the ascending gases is not generally practical, this introducing other problems. For these reasons, ores containing too high a concentration of fines cannot be utilized in a process.

The present invention seeks to obviate these problems, and has for its primary objective a solution to the problem of fines production in an iron ore reduction process. In particular, its prime objective is to provide the art with a simplified, new, and improved fluidized iron ore reduction process wherein fines can be conveniently handled, making feasible the use of greater quantities of fines-bearing ores. More specifically, it is an objective to provide such process wherein oxidic iron ores are successively treated with a reducing gas, or gases, in a series of staged reaction zones to reduce the iron oxides to lower stages of oxidation, and to metallic iron.

These and other objects are achieved in accordance with the present invention which contemplates separating a particulate ore into fractions or portions, one portion of which is a "fines portion" which is fed directly into a ferrous reduction zone, or zones, while the residual portion, or portions, is introduced to a ferric reduction zone. The particulate solids ore is preferably separated into two fractions, viz., a fines fraction and a residual fraction containing the larger or coarser particles. The fines fraction is introduced directly into a ferrous reduction zone, or zones, and the fraction containing the coarser particles is introduced directly into the first ferric reduction zone of the series.

The separation of fines from the total aggregate of iron ore solids particles and introduction thereof directly into a ferrous reduction zone, and preferably to the final ferrous reduction zone of the series, provides unique advantages. Thus, the small particles are relatively rapidly reduced and metallized by the high concentration of fresh reducing gas entering the reaction stages. This causes "growth" or aggregation of the small particles, this lessening their tendency to be blown from the reactor. Moreover, the distance the particles must travel prior to any possible exit from the process greatly increases the tendency for growth of particle size and conversely decreases the tendency of the particles to be lost via entrainment with the exit gases. Furthermore, when fines are introduced into the ferric reduction zone, they are reduced to magnetic oxide of iron, which type of fines tend to clog cyclones and auxiliary equipment. By by-passing fines directly to the ferrous reduction zone, the fines are converted to metallic metal and hence the troublesome problem of cyclone fouling is largely eliminated.

In accordance with the best mode of practicing the invention, it is desirable to control the amount of fines introduced into the ferrous reduction zone, or zones, at any one time. Preferably, from about 1 to about 40, and more preferably from about 15 to about 20 percent, based on the weight of the ore processed, is introduced into the ferrous reduction zone, or zones, as fines while the balance of the ore is introduced to the ferric reduction zones.

The particulate ore generally ranges from sub micron size, though generally sizes ranging smaller than about two microns are discounted, to about 5000 microns prior to separation. The fines portion is characterized as that portion thereof which will pass through a standard 325 mesh Tyler screen. A preferred particle size distribution of fines, however, is that portion of the iron oxides solids particles which will pass through a 400 mesh Tyler screen. Thus, in a highly preferred particle size distribution, the fines within range from about sub micron size, or from about 2 microns, to about 38 microns (400 mesh).

The invention will be better understood by reference to the following schematic diagram or figure and to the accompanying description which makes specific reference to the figure.

Referring to the figure, there is shown a reaction vessel 10 which contains a series of beds of particulate iron ore fluidized by contact with upwardly flowing reducing gas introduced into the reactor 10 via line 11. Iron oxides consisting essentially of ferric oxide are continuously introduced into the top of reactor 10 through line 21 and are flowed downwardly from one fluidized bed to another. In the top portion of reactor 10 the ore is reduced to an intermediate product which, though it consists substantially of ferrous oxide, also contains minor amounts of higher oxides and metallic iron. Thus, in the top series of fluidized beds 12, $12_1$, etc., i.e., the ferric reduction stages, iron oxides are reduced in steps from ferric oxide to magnetite, and from magnetite to ferrous oxide. In the lower zone, or series of zones 13, $13_1$, etc., ferrous oxide is reduced to metallic iron. In an intermediate zone, e.g., $13_1$, the ore can be 50 to 85 percent metallized and in the final ferrous reduction zone 13 the ore can be 85 to 95 percent metallized prior to withdrawal.

The reduction zones are preferably operated at temperatures ranging from about 1000° F. to just below the sintering temperature of the ore, i.e., about 1800° F. for most ores. Preferably, the temperatures of the ferric reduction zones are operated at temperatures ranging from about 1300° F. to about 1400° F. and the ferrous reduction zones at temperatures ranging from about 1400° F. to about 1600° F.

Ascending gas currents maintain the individual beds in 12, $12_1$, 13, $13_1$, etc. in fluidized state. The fluidizing gases in contact with the solids can entrain finer particles and carry these into bed 12 from whence they can exit with the effluent gas except to the extent that the entrained solids are separated from the gases by cyclone separators 14, 15 and returned through lines 16, 17 to bed 12. The prevention of fines escaping from the process via the process of this invention, however, is shown by reference to that portion of the system by virtue of which particulate ore is introduced into the system, infra.

In accordance with this invention, particulate ore from the feed hopper 19 is separated into a fine portion, i.e., particles of about 325 mesh and finer, and a residual solids portion which is as coarse as or coarser than about 325 mesh. This separation is readily made with a 325 mesh screen 20. The coarser portion, i.e., that portion of ore retained on top of the screen, is sent to zone 12 via line 21. The final portion, i.e., that portion of ore which passes through the screen, is sent to zone 13 or zone $13_1$, or both, via lines 22, 23 or lines 22, 24 or lines 22, 23, 24.

If desirable, additives for suppressing bogging can also be employed in ferrous reduction zones 13, $13_1$. Such additives can, in fact, prove rather useful at the higher temperatures of operation. Moreover, all or a portion of the reducing gases can be generated in situ, e.g., by introduction of a hydrocarbon into the ferrous reduction zones via injection through line 25.

Having described the invention, what is claimed is:

1. A method of lessening fouling of cyclone separators used in fluidized iron ore reduction processes having a ferric reduction zone and a ferrous reduction zone, said ferrous reduction zone maintained at temperatures ranging from about 1400° F. to about 1600° F., comprising:

separating a particulate iron ore feed into a fines portion having particle sizes ranging less than about 325 mesh and a coarse portion having particle sizes ranging greater than about 325 mesh, and introducing the fines portion directly into the ferrous reduction zone and the coarse portion directly into the ferric reduction zone, whereby the particles in said fines portion are agglomerated and enlarged in size.

2. The method of claim 1 wherein said fines portion constitutes from about 1% to about 40% of the total ore feed.

3. The method of claim 2 wherein the fines portion constitutes from about 15% to about 20% of the total ore feed.

4. The method of claim 3 wherein said fines portion is of particle size ranging less than about 400 mesh.

References Cited

UNITED STATES PATENTS

| | | | |
|---|---|---|---|
| 2,877,107 | 3/1959 | Magness | 75—35 |
| 2,996,373 | 8/1961 | Agarwal | 75—26 |
| 3,020,149 | 2/1962 | Old et al. | 75—26 |
| 3,021,208 | 2/1962 | Feinman | 75—26 |
| 3,246,978 | 4/1966 | Porter et al. | 75—26 |
| 3,227,546 | 1/1966 | Johnson et al. | 75—26 |
| 3,295,956 | 1/1967 | Whaley | 75—26 |

HYLAND BIZOT, *Primary Examiner.*

H. W. TARRING, *Assistant Examiner.*